Figure 3:
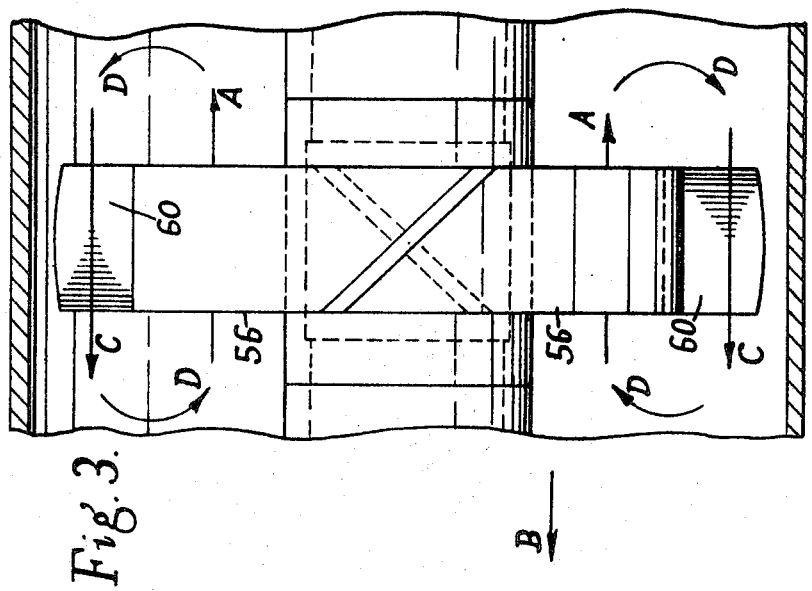

United States Patent

Baker

[15] 3,652,062
[45] Mar. 28, 1972

[54] MIXING APPARATUS
[72] Inventor: Donald E. Baker, Ruston Spencer, near Macclesfield, England
[73] Assignee: The E. T. Oakes Corporation, Islip, Long Island, N.Y.
[22] Filed: Apr. 2, 1969
[21] Appl. No.: 812,706

Related U.S. Application Data

[63] Continuation-in-part of Ser. No. 570,605, Aug. 5, 1966, Pat. No. 3,456,599.

[30] Foreign Application Priority Data

Apr. 8, 1968 Great Britain......................16,871/68

[52] U.S. Cl. ....................................259/9, 18/2 MC, 259/68
[51] Int. Cl. .........................................................B01f 7/04
[58] Field of Search......................259/DIG. 11, 68, 69, 9, 10, 259/25, 26, 45, 46, 97, 109, 110; 107/4 A, 30, 40, 54 B; 416/193, 199, 201, 203; 18/2 MC

[56] References Cited

UNITED STATES PATENTS

| 655,270 | 8/1900 | Perry | 416/193 |
| 1,247,263 | 11/1917 | Grindle | 416/193 |
| 3,188,183 | 6/1965 | Logan | 259/9 X |
| 3,467,198 | 9/1969 | Ellinger | 416/203 |
| 2,017,116 | 10/1935 | Bonnell | 259/110 |
| 2,390,460 | 12/1945 | Presser | 259/97 |

Primary Examiner—Walter A. Scheel
Assistant Examiner—Alan I. Cantor
Attorney—Brumbaugh, Graves, Donohue & Raymond

[57] ABSTRACT

A rotor for mounting on the shaft of an axial flow kneading machine between two series of kneading elements has radially inner and outer sets of blades which are inclined in opposing senses respectively, so that, in use, the radially inner layers of material kneaded by the first series of kneading elements will be decelerated by the inner set of rotor blades and displaced outwardly before being advanced through the second series of kneading blades, while the radially outer layers of such material will be correspondingly accelerated and displaced inwardly.

7 Claims, 3 Drawing Figures

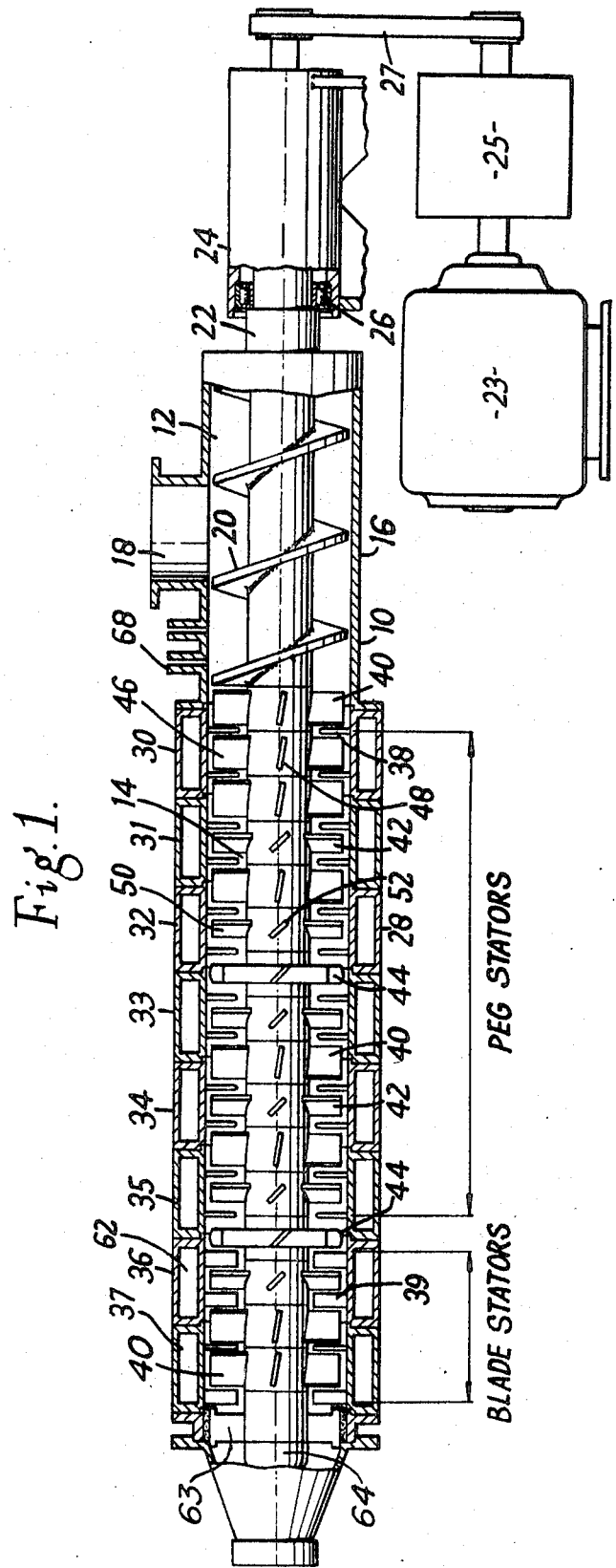

MIXING APPARATUS

This application is a continuation-in-part of my copending application Ser. No. 570,605 filed Aug. 5, 1966, now Pat. No. 3,456,599, which discloses one example of a machine for mixing and modifying dough.

The present invention relates to mixing apparatus and their component parts.

The invention finds application in apparatus for mixing and modifying dough, to obtain the required gas-retention properties during the production of bread and like products.

Dough is modified, or developed, by subjecting it to a beating and kneading action which changes its rheological properties so that it is converted into a form suitable for the retention of gas.

This machine comprises a feeding chamber, enclosing a feeding screw which passes the materials from which the dough is to be made to a mixing chamber in which the materials are mixed by means of rotors and stators, and a modifying chamber in which the dough is modified by means of further rotors and stators which subject it to a stretch and relax action. It is not necessary, however, to limit the functions of mixing and modifying the dough to separate chambers and embodiments of the machine exist in which the rotors and stators serve both to mix and modify the dough.

The dough is mixed and modified in the machine according to the said U.S. Pat. No. 3,456,599 by means including a rotor, hereinafter called an axial alternator, comprising two pairs of blades which are inclined to the axis of the alternator in opposing senses so that when the alternator is rotated in a viscous material there is no, or little, resultant axial thrust exerted on the material, but an alternating mixing action is set up substantially in a plane perpendicular to the axis of rotation of the alternator.

It is found, however, that this mixing is incomplete and the dough passes through the machine in annular layer, the layers remaining at substantially constant radial distances from the axis of rotation of the alternator. As the linear velocity of the blades increased with distance from the axis of the shaft on which the alternator is mounted, the annular layers of dough are subjected to an increasing mixing and modifying action as their radii increase.

In addition to being subjected to variable mixing and modifying in their passage through the mixing and modifying chamber, the various layers of dough pass through the machine at different rates. For example, in the case of bread dough it has been found experimentally that inner layers of dough may pass through 30 percent faster and outer layers 30 percent slower than an intermediate layer. The cumulative effect of the inner layers being subjected to a lower degree of mixing and passing through the chamber faster than the outer layers is that these inner layers are considerably underdeveloped. Instead of receiving energy at the optimum rate of 0.4 h.p. min./lb., inner layers of dough may receive energy at less than half this rate. If the dough piece extruded from the machine is cut, tinned, proved and baked, most of the finished loaf will be of good texture, but it will have a core of open texture with thick cell walls.

Although the invention has been discussed primarily in terms of dough, it will be understood that the invention is not limited to the production of dough but is also applicable to the processing of other like materials, for example cake batter and synthetic plastic materials in a soft condition.

According to the present invention there is provided a rotor suitable for use in mixing and/or kneading machines and comprising two parts located in different radially-spaced positions, and arranged, upon rotation of the rotor, to provide impelling forces in opposite axial directions respectively.

Such a rotor will be referred to as a radial inverter.

The two parts of the radial inverter may be rotor blades which are arranged, upon rotation of the inverter, to sweep two substantially concentric annular zones respectively, the blade which is arranged to weep one zone being inclined to the axis of the radial inverter in an opposing sense to that which is arranged to sweep the other zone so that, upon rotation of the radial inverter, opposing impelling forces are induced in the two annular zones.

A preferred form of the radial inverter comprises an inner series of four radially extending rotor blades equally spaced about the axis of the inverter and arranged, upon rotation of the inverter, to sweep an inner annular zone and an outer series of four radially extending rotor blades equally spaced bout the axis of the inverter and arranged, upon rotation of the inverter, to sweep an outer annular zone, the blades of the inner series being inclined to the axis of the inverter in an opposing sense to those of the outer series.

The outer radius of the inner zone may be equal to or just less than the inner radius of the outer zone.

The radially outer ends of the blades of the inner series and the radially inner ends of the blades of the outer series may be rigidly fixed to a ring located between the inner and outer annular zones.

In a preferred form of the inverter the areas of the inner and outer annular zones are approximately equal, that is, the area for dough flow in the forward and reverse direction is about the same. However, due to the higher mean linear velocity of the blades in the outer zone a slight overall forward motion may be imparted to the dough.

Apparatus suitable for use in the production of dough comprises a mixing and modifying chamber housing a plurality of rotatable elements for mixing and kneading dough and means for feeding dough through the chamber. At least one rotatable element consists of a radial inverter having rotor blades in different radial positions within the chamber, the blade, or blades, in an inner one of the two zones being inclined to the axis of the radial inverter in an opposing sense to the blade, or blades, in the outer one of the two zones being inclined to the axis of the radial inverter in an so that in operation, upon rotation of the radial inverter dough in the inner zone is impelled by the radial inverters in an axial direction opposed to the general direction of flow and dough in the outer zone is impelled by the radial inverters in the same direction as the general direction of flow.

The apparatus for mixing and modifying dough may include two radial inverters mounted for rotation on a common drive shaft, and interspersed between them also mounted for rotation on the shaft at least one axial alternator, and at least one further rotatable element, hereinafter called an impeller, having at least one rotor blade so inclined to the axis of the impeller that, when the impeller is rotated in the dough, axial impelling forces in the same direction as the general direction of flow are induced in the dough by the impeller.

Figure 2:
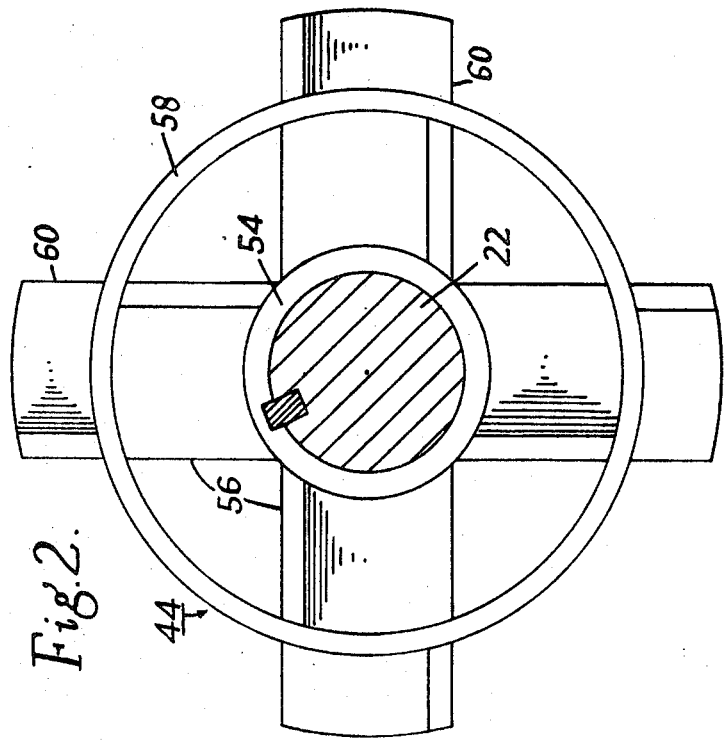

The invention will now be described by way of example with reference to the accompanying drawings in which:

FIG. 1 is a longitudinal cross section of a mixing and modifying machine for dough, FIG. 2 is an end view of a radial inverter, and FIG. 3 is a side elevation of the inverter of FIG. 2.

The mixing and modifying machine 10 shown in FIG. 1 is for use in the continuous production of dough. The machine 10 consists of a feeding chamber 12 and a mixing and modifying chamber 14. The feeding chamber 12 has a cylindrical casing 16 provided with an inlet port 18 in the upper part thereof. An Archimedean screw 20 is located coaxially within the feeding chamber 12 and is keyed to a main drive shaft 22 which extends through the mixing and modifying chamber 14. At the end of the feeding chamber 12 remote from the chamber 14, the main shaft 22 is coupled to a reduction gearbox 24 driven by an electric motor 23 via a variable-speed gear 25 and a belt drive 27, whereby the shaft 22 can be driven at any desired speed between 63 r.p.m. and 382 r.p.m.

The main shaft 22 is overhung, being supported at one end only, by suitable bearings, of which only one, 26, is shown in the drawing.

The mixing and modifying chamber 14 is of circular cross section and is enclosed by a casing 28 which is detachably fastened to the feeding-chamber casing 16. The casing 28 is formed from a series of casing parts 30 to 37 which are connected together detachably to facilitate cleaning and adjustment. Extending radially inwards from the casing 28 are a number of stators consisting of pegs 38 and blades 39 in the sections of the casing defined by the casing parts 30 to 35 and 36, 37 respectively, interleaved with three types of rotor, which will be referred to for ease of description as impellers 40, axial alternators 42 and radial inverters 44, arranged in the order shown and keyed to the main shaft 22.

Each impeller 40 comprises two pairs of blades 46 and 48 which are so angled that, when the impeller is rotated in a fluid, the resulting axial thrust is in such a direction as to enhance the thrust due to the screw 20. Each axial alternator 42 comprises two pairs of blades 50 and 52 which are so angled that when the rotor is rotated in a fluid there is not resultant axial thrust. The construction and action of the axial alternators 42 is described in more detail in our aforementioned patent specification.

Each radial inverter 44 (FIGS. 2 and 3) comprises a boss 54 keyed to the main shaft 22. Extending radially outwardly from the boss 54 are two pairs of blades 56 so angled as to urge fluid in the space swept by them in a direction opposed to the general direction of flow when the inverter 44 is rotated. Affixed to the outer edges of the blades 56 is a supporting ring 58, extending radially outwardly from the outer surface of which are two further pairs of blades 60 so angled as to urge fluid in the space swept by the blades 60 in the same direction as the general direction of flow. The effect of these opposing actions will be described hereinafter.

The casing 28 is formed with water jackets 62. The temperature in the chamber 14 may be controlled by regulating the temperature and/or the rate of flow of water circulated through these water jackets 62.

In the embodiment shown, the main shaft 22 is of such a length that 16 rotors can be keyed to it. Other embodiments may have more rotors and correspondingly more casing parts. The casing parts and rotors are so constructed that they can easily be detached and replaced by spacing elements if required. The rotors are slid onto the main shaft 22 and locked in place by means of a nut 64 situated aft of the impeller 63 which is similar to the impellers 40 but has nylon pads on the tips of the blades. One or more of the rotors may be replaced by a non-working spacing element (not shown). The purpose of such spacing elements is to reduce the work done by the rotors on the dough as will be explained hereinafter.

The casing parts 30 to 37 are secured by longitudinal bolts (not shown) passing through the water jackets 62 and screwed into the end of the feeding chamber casing 12.

In addition to enabling the number of working elements to be varied, the construction of the rotors and casing parts walls all the parts of the machine which come into contact with dough to be dismantled easily to facilitate cleaning.

When the mixing and modifying machine is in operation, flour is fed through the inlet port 18. The flour falls onto the Archimedean screw 20 which is rotated in a sense such that it acts as a feed screw and conveys the flour to the chamber 14. While the flour is being conveyed, liquid is injected into the feeding chamber 12 from injection points 68 located on the upper half of the chamber 12 after the inlet port 18.

In the chamber 14, the first three impellers 40 mix the dough ingredients in conjunction with their associated stator pegs 38 and urge it towards the other rotors including axial and radial inverters and further impellers 40. The main function of subsequent impellers 40 is to maintain the flow of dough through the machine 10, although they also contribute some beating and kneading action to the dough. The axial alternators 42 exert a kneading action on the dough, as it is advanced by the impellers 40 through the mixing and modifying chamber 14, by alternately thrusting it axially forward in its general direction of advance and axially backward in the reverse direction, the direction of thrust being reversed once per revolution of the shaft 22. The action of the axial alternators 42 which are near the inlet end of the chamber 14 is predominantly a mixing action, whereas the action of those axial alternators which are located further towards the outlet end of the chamber 1 becomes progressively more of a developing action. The function of the radial inverters 44 is to ensure that all the dough passing through the chamber 14 is uniformly mixed and developed and kept at a uniform temperature, for which purpose each of these radial inverters is arranged to decelerate the dough advancing in the radially inner zone near the shaft 22 and accelerate the dough advancing in the radially outer zone near the casing, while at the same time continuously transferring dough from the inner zone to the outer zone and vice versa.

As can be seen from FIG. 1, the radial inverters 44 are spaced at intervals along the shaft 22.

In the chamber 14, the rheological properties of the dough are changed by the beating and kneading action of the impeller blades 46, 48, the alternator blades 50, 52 and the inverter blades 56, 60 and more especially by that due to the cooperation of the blades 46, 48, 50, 52, 56 and 60 with the stator pegs 38 and blades 39.

When the radial inverter 44 is rotated, the blades 56 and 60 respectively urge inner layers of dough in a direction (indicated by arrows A, FIG. 3) opposed to the general direction of flow (indicated by arrow B) and outer layers in the same direction as the general direction of flow (arrow C).

The effect of these opposing actions is to decelerate inner layers and accelerate outer layers of dough, creating a mixing action (as indicated by arrow D) perpendicular to the axial direction of flow and extending over the entire swept area of the radial inverter 44. The result is a generally toroidal mixing of material between the inner and outer layers, so that all of the dough is mixed and energized to approximately the same degree.

In addition, the inclusion of the radial inverters spaced along the length of the chamber 14 serves to minimize the temperature differential between inner and outer layers of dough extruded from the machine 10.

The radial inverters thus tend to alleviate the problems arising from insufficient mixing of the dough and, by preventing the formation of annular layers, they ensure that all of the dough is energized uniformly.

In addition to the mixing action, the axial alternators and radial inverters in cooperation with the stators knead or develop the dough by a stretch and relax action.

It will also be appreciated that there are other arrangements for the blades of the radial inverters to obtain the required mixing and modifying action, the only requirement being that the blades are so inclined to the axis of the inverter that inner and outer layers of dough are urged in opposing and the same directions respectively to the general direction of flow.

I claim:

1. In a kneading apparatus having
an elongated kneading chamber having an inlet at one end and an outlet for kneaded material at the other end,
means for feeding material to be kneaded into said kneading chamber through said inlet,
a rotary shaft having its axis of rotation coincident with the longitudinal centerline of said kneading chamber,
first and second kneading elements mounted on said rotary shaft at spaced apart positions along its length, and
a rotor mounted on said rotary shaft between said first and second kneading elements, the improvement in said rotor comprising:
a hub,
a series of radially inner impeller blades mounted on said hub and inclined in a sense to cause deceleration of material advanced through said kneading chamber by said feeding means,
a ring rigidly fixed to the radially outer ends of said radially inner impeller blades, and
a series of radially outer impeller blades rigidly fixed at their blade roots to said ring and inclined in a sense to cause acceleration of material advanced through said kneading chamber by said feeding means.

2. In a kneading apparatus having an elongated kneading chamber having an inlet at one end and an outlet for kneaded material at the other end,
   means for feeding material to be kneaded into said kneading chamber through said inlet,
   a rotary shaft having its axis of rotation coincident with the longitudinal centerline of said kneading chamber, and
   first and second kneading means mounted on said rotary shaft at spaced apart positions along its length for kneading material while allowing the passage thereof through the chamber along paths generally parallel to the longitudinal centerline of the chamber, the improvement comprising:
   means located between the first and second kneading means for effecting a generally toroidal mixing of material of radially outer annular layers and with material of radially outer annular layers during the generally axial advance of such material from the first kneading means to the second kneading means.

3. In a kneading apparatus according to claim 2, wherein the means for effecting generally toroidal mixing between radially inner layers and radially outer layers of material comprises:
   a hub carried by the rotary shaft,
   at least one radially inner impeller blade carried by the hub and inclined in a sense to cause deceleration of material advanced through the kneading chamber, and
   at least one radially outer impeller blade carried by the hub and inclined in a sense to cause acceleration of material advanced through the kneading chamber.

4. In a kneading apparatus according to claim 3 wherein:
   the radially inner impeller blade is one of an inner series of four similar radially extending blades equally spaced about the rotary shaft axis,
   a ring is rigidly fixed to the radially outer ends of the four blades of the inner series, and
   the radially outer impeller blade is one of an outer series of four similar radially extending impeller blades equally spaced about the rotary shaft axis and having their blade roots rigidly fixed to the ring.

5. In a kneading apparatus according to claim 4 wherein:
   the lengths of the blades of the inner series are in a ratio to the lengths of the blades of the outer series such that the zone swept by each of the series of blades upon rotation of the rotary shaft is substantially equal to that swept by the other series of blades.

6. In a kneading apparatus according to claim 2 wherein:
   each of the first and second kneading means includes at least one rotor having a plurality of radially extending blades, each of which is inclined in the same sense relative to the direction of movement of the material through the chamber, and at least one rotor having at least one pair of radially extending blades, one of which is inclined relative to the direction of movement of the material through the chamber opposite in sense to the other blade of the pair, and wherein
   the means for effecting generally toroidal mixing between radially inner annular layers and radially outer annular layers of material includes a rotor mounted on the rotary shaft between the first and second kneading means and having a series of radially inner impeller blades inclined in a sense to cause deceleration of material advanced through the kneading chamber and a plurality of radially outer impeller blades rigidly connected to the radially inner impeller blades and inclined in a sense to cause acceleration of material advanced through the kneading chamber.

7. In a kneading apparatus according to claim 2 wherein:
   the rotors of the first and second kneading means and the rotor of the material mixing means are removably mounted on the rotary shaft so as to be interchangeable in position along the shaft.

* * * * *

PO-1050
(5/69)

UNITED STATES PATENT OFFICE
CERTIFICATE OF CORRECTION

Patent No. 3,652,062　　　　　　　Dated March 28, 1972

Inventor(s) Donald E. Baker

It is certified that error appears in the above-identified patent and that said Letters Patent are hereby corrected as shown below:

Column 1, line 39, "increased" should be --increases;

line 74, "weep" should be --sweep--;

Column 2, line 8, "bout" should be --about--;

lines 34-35 "being inclined to the axis of the radial inverter in an" should be deleted;

Column 3, line 15, "not" should be --no--;

line 51, "walls" should be --allows--;

Column 4, line 3, "1" should be --14--;

Column 5, line 16, "outer" should be --inner--;

Column 6, line 32, "2" should be --6--.

Signed and sealed this 9th day of January 1973.

(SEAL)
Attest:

EDWARD M. FLETCHER, JR.
Attesting Officer

ROBERT GOTTSCHALK
Commissioner of Patents